United States Patent
Suzuki et al.

(10) Patent No.: US 9,780,899 B2
(45) Date of Patent: Oct. 3, 2017

(54) RADIO COMMUNICATION APPARATUS, TRANSMISSION APPARATUS, AND RECEPTION APPARATUS

(71) Applicant: Mitsubishi Electric Corporation, Chiyoda-ku (JP)

(72) Inventors: Kazumasa Suzuki, Tokyo (JP); Kazuaki Ishioka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/023,875

(22) PCT Filed: Jul. 17, 2014

(86) PCT No.: PCT/JP2014/069118
§ 371 (c)(1),
(2) Date: Mar. 22, 2016

(87) PCT Pub. No.: WO2015/045585
PCT Pub. Date: Apr. 2, 2015

(65) Prior Publication Data
US 2016/0241351 A1    Aug. 18, 2016

(30) Foreign Application Priority Data
Sep. 24, 2013    (JP) .................................. 2013-196876

(51) Int. Cl.
*H04L 27/18*    (2006.01)
*H04J 11/00*    (2006.01)
(Continued)

(52) U.S. Cl.
CPC ........ *H04J 11/0023* (2013.01); *H04L 5/0007* (2013.01); *H04L 27/2602* (2013.01);
(Continued)

(58) Field of Classification Search
CPC .............. H04J 11/0023; H04L 27/2636; H04L 27/2691; H04L 27/2602; H04L 27/2071; H04L 5/0007; H04L 1/20
(Continued)

(56) References Cited

U.S. PATENT DOCUMENTS 5,771,224 A  *  6/1998  Seki ........................ H04L 27/18
                                                              370/206
2005/0207351 A1    9/2005  Inagawa
(Continued)

FOREIGN PATENT DOCUMENTS

EP         1 006 699 A2    6/2000
JP         8-265293 A     10/1996
(Continued)

OTHER PUBLICATIONS

International Search Report Issued Sep. 30, 2014 in PCT/JP14/069118 Filed Jul. 17, 2014.
(Continued)

*Primary Examiner* — Siu Lee
(74) *Attorney, Agent, or Firm* — Oblon, McClelland, Maier & Neustadt, L.L.P.

(57) ABSTRACT

A radio communication apparatus that performs radio communication according to a multicarrier scheme includes: a transmitting unit including a null inserting unit that dispersedly arranges null symbols in a two-dimensional space of time and frequency in radio data, and a differential modulating unit that performs differential modulation on a data symbol part other than the null symbols; and a receiving unit including an interference measuring unit that measures interference power for a data symbol that is a measurement target by using a null symbol adjacent to the data symbol in the two-dimensional space of time and frequency, and a delay detecting unit that performs weighting on each data
(Continued)

symbol according to the interference power measured for each data symbol and that performs delay detection between data symbols.

20 Claims, 5 Drawing Sheets

(51) Int. Cl.
- H04L 27/26 (2006.01)
- H04L 5/00 (2006.01)
- H04L 1/20 (2006.01)
- H04L 27/20 (2006.01)

(52) U.S. Cl.
CPC ...... *H04L 27/2636* (2013.01); *H04L 27/2691* (2013.01); *H04L 1/20* (2013.01); *H04L 27/2071* (2013.01)

(58) Field of Classification Search
USPC ....... 375/259, 260, 285, 295, 296, 316, 340, 375/342, 346, 348, 349
See application file for complete search history.

(56) References Cited

U.S. PATENT DOCUMENTS

| | | | | |
|---|---|---|---|---|
| 2009/0154370 | A1* | 6/2009 | Yamaguchi | H04B 1/7097 370/252 |
| 2010/0048151 | A1* | 2/2010 | Hara | H04J 11/0056 455/115.1 |
| 2010/0086068 | A1* | 4/2010 | Sahara | H04B 7/0851 375/260 |
| 2010/0311452 | A1* | 12/2010 | Li | H04W 72/08 455/509 |
| 2011/0003551 | A1 | 1/2011 | Kameno et al. | |
| 2011/0243268 | A1 | 10/2011 | Mashino et al. | |
| 2011/0317682 | A1 | 12/2011 | Matsumura et al. | |
| 2013/0208619 | A1* | 8/2013 | Kudo | H04B 7/0452 370/252 |

FOREIGN PATENT DOCUMENTS

| | | |
|---|---|---|
| JP | 2000-68973 A | 3/2000 |
| JP | 2000-165346 A | 6/2000 |
| JP | 2001-77789 A | 3/2001 |
| JP | 2005-79905 A | 3/2005 |
| JP | 2005-269392 A | 9/2005 |
| JP | 2008-53865 A | 3/2008 |
| JP | 2009-147498 A | 7/2009 |
| JP | 2010-4280 A | 1/2010 |
| JP | 4906875 B2 | 3/2012 |
| WO | 2008/099785 A1 | 8/2008 |
| WO | WO2009/096319 A1 | 8/2009 |
| WO | 2010/070925 A1 | 6/2010 |
| WO | 2011/083535 A1 | 7/2011 |

OTHER PUBLICATIONS

Office Action issued Oct. 25, 2016 in Japanese Patent Application No. 2015-255958 (with Partial English translation).

* cited by examiner

RADIO COMMUNICATION APPARATUS, TRANSMISSION APPARATUS, AND RECEPTION APPARATUS

FIELD

The present invention relates to a radio communication apparatus, a transmission apparatus, and a reception apparatus.

BACKGROUND

In recent years, public attention has been attracted to radio-based train control systems in which radio communication is performed between a train and a wireless base station installed along a railroad and operation control and speed control of a train are performed on the basis of information transmitted via the radio communication. The radio-based train control system is more advantages than a train operation control scheme by a conventional fixed block section in terms of an installation cost and a maintenance cost since a track circuit is unnecessary. Further, since it is possible to construct a flexible block section free from a fixed section, it is possible to increase a train operation density, and it is also advantageous in terms of an operation cost.

With the radio-based train control system, there are cases in which an industry science medical (ISM) band is used for radio communication between the ground and a train from a cost perspective because license is unnecessary for the ISM band. However, with the ISM band, other systems, such as a wireless local area network (LAN) or Bluetooth (registered trademark), are widely used, and use of such systems in a train or a rail side building can be a large source of interference for the radio-based train control system. For this reason, with the radio-based train control system, techniques regarding the interference immunity are important technique for performing stable communication.

A technique for implementing high-quality communication in an environment in which there is a lot of interference is disclosed, for example, in Patent Literature 1. This is a technique in which, in orthogonal frequency division multiplexing (OFDM), null symbols are dispersedly arranged in time-frequency slots, interference power is measured in a null symbol with a high degree of accuracy, and a transmission control process and an inter-antenna synthesis process are performed on the basis of the measured interference power.

CITATION LIST

Patent Literature

Patent Literature 1: Japanese Patent No. 4906875

SUMMARY

Technical Problem

However, according to the technique in the related art, transmission path estimation is performed using a pilot symbol and synchronous detection is performed on the basis of the transmission path estimation result. For this reason, when this technique is used, for example, in an environment in which the movement speed is fast, in order to follow a fast transmission path variation, it is necessary to insert more pilot symbols into the wireless frame than when this technique is used in an environment in which the movement speed is slow, and thus there is a problem in that transmission efficiency is lowered.

The present invention is achieved in view of the above, and it is an object of the present invention to obtain a radio communication apparatus, a transmission apparatus, and a reception apparatus that are capable of securing interference immunity, following a transmission path variation, and preventing a decrease in transmission efficiency.

Solution to Problem

In order to solve the above problems and achieve the object, an aspect of the present invention is a radio communication apparatus that performs radio communication according to a multicarrier scheme, including: a transmitting unit that includes a null inserting unit that dispersedly arranges null symbols in a two-dimensional space of time and frequency in radio data, and a differential modulating unit that performs differential modulation on a data symbol part other than the null symbols; and a receiving unit that includes an interference measuring unit that measures interference power for a data symbol that is a measurement target by using a null symbol adjacent to the data symbol in the two-dimensional space of time and frequency, and a delay detecting unit that performs weighting on each data symbol according to the interference power measured for each data symbol and that performs delay detection between data symbols.

Advantageous Effects of Invention

According to a radio communication apparatus, a transmission apparatus, and a reception apparatus of the present invention, an effect in which it is possible to secure interference immunity, follow a transmission path variation, and prevent a decrease in transmission efficiency is obtained.

DESCRIPTION OF EMBODIMENTS

Hereinafter, embodiments of a radio communication apparatus, a transmission apparatus, and a reception apparatus according to the present invention will be described in detail with reference to the appended drawings. The invention is not limited to the following embodiments.

First Embodiment

Figure 1:
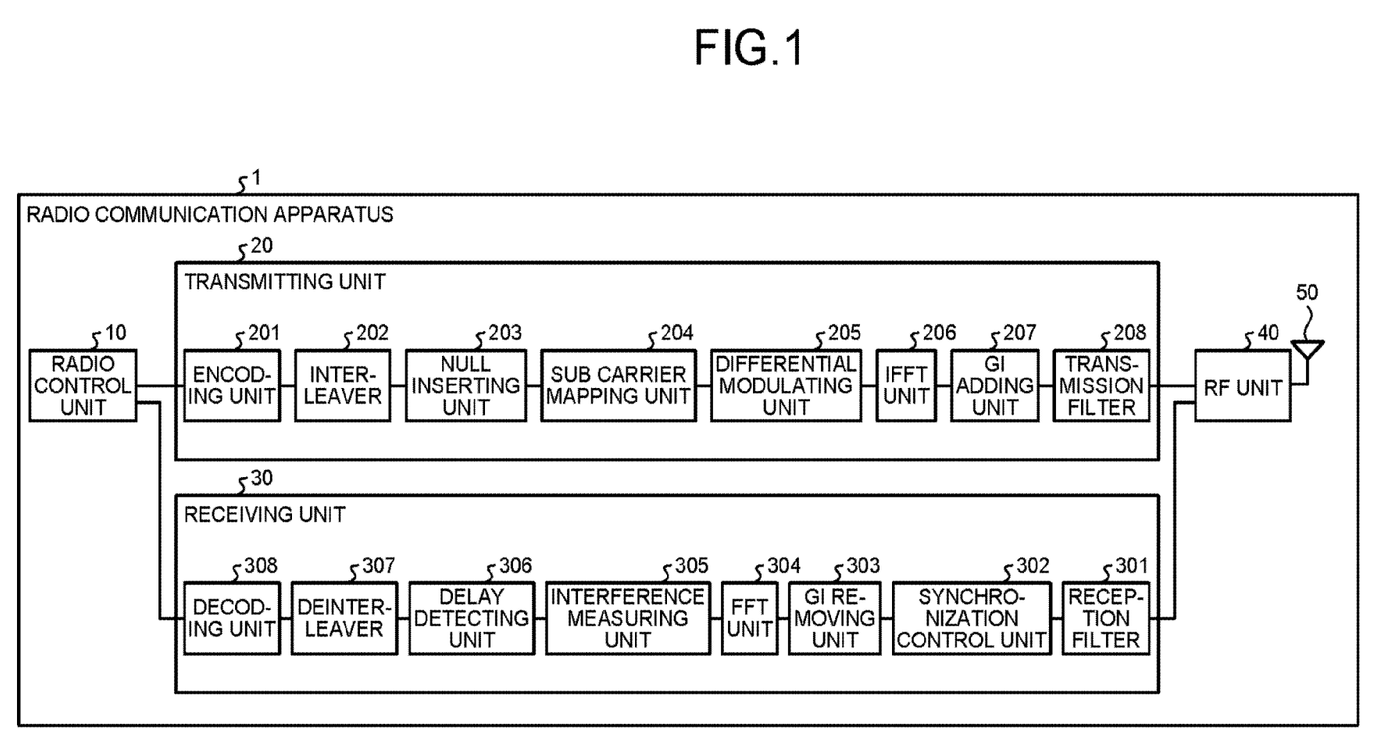
FIG. 1 is a diagram illustrating an exemplary configuration of a radio communication apparatus according to a first embodiment.

FIG. 1 is a diagram illustrating an exemplary configuration of a radio communication apparatus according to the present embodiment. A radio communication apparatus 1 includes a radio control unit 10 that controls transmission and reception of radio signals; a transmitting unit 20 that converts transmission data received from the radio control unit 10 into a radio transmittable format and outputs the resulting transmission data to a radio frequency (RE) unit 40; a receiving unit 30 that obtains original transmission data by performing a demodulation process and the like on signal waveform data received from the RF unit 40; the RE unit 40 that performs digital to analog (DA) conversion on data received from the transmitting unit 20, transforms the frequencies into carrier frequencies, performs signal amplification, and outputs the amplification result to an antenna 50 at the time of transmission, and that converts the received signal into a baseband signal by adjusting the gain of the received signal, performs analog to digital (AD) conversion, and outputs the conversion result to the receiving unit 30 at the time of reception; and the antenna 50 that radiates data received from the RE unit 40 to an antenna at the time of transmission and receives radio waves at the time of reception.

The transmitting unit 20 includes an encoding unit 201 that performs an encoding process such as convolution encoding on transmission data; an interleaver 202 that reorders data in order to cause the encoded data to have resistance to a burst error in a transmission path; a null inserting unit 203 that determines an arrangement of null symbols in the two-dimensional space of an OFDM symbol (time) and a sub carrier (frequency); a sub carrier mapping unit 204 that performs mapping of the interleaved data to symbols other than null symbols; a differential modulating unit 205 that performs differential modulation on the mapped data; an inverse fast Fourier transform (IFFT) unit 206 that transforms data in a frequency domain into data in a time domain for the data that has been mapped to each sub carrier and has undergone the differential modulation for each OFDM symbol; a guard interval (GI) adding unit 207 that inserts a copy of a part of the tail of time waveform data that has undergone an IFFT to the head as a guard interval for each OFDM symbol in order to reduce the effect of inter-symbol interference caused by a multipath in a transmission path; and a transmission filter 208 that performs a filter process in order to suppress power leakage outside a band as necessary.

The receiving unit 30 includes a reception filter 301 that removes a component outside a band from the input signal received from the RF unit 40; a synchronization control unit 302 that performs time synchronization on the received signal and corrects a frequency deviation between a transmission side apparatus and a reception side apparatus; a GI removing unit 303 that removes the guard interval at a timing of an OFDM symbol determined by the synchronization control unit 302; a fast Fourier transform (FFT) unit 304 that transforms time waveform data into frequency data of each sub carrier for each OFDM symbol; an interference measuring unit 305 that measures the power of a null symbol; a delay detecting unit 306 that performs weighting on data symbols on the basis of the interference power measured by the interference measuring unit 305 and performs delay detection; a deinterleaver 307 that reorders data, similarly to the time of transmission; and a decoding unit 308 that performs error correction using a Viterbi decoding algorithm or the like.

In FIG. 1, the radio communication apparatus 1 is configured to include the radio control unit 10, the transmitting unit 20, the receiving unit 30, the RF unit 40, and the antenna 50 and transmit and receive the radio signals; however, it is also possible to configure the radio communication apparatus 1 such that it performs either of transmission and reception. For example, the radio communication apparatus 1 may be a transmission apparatus including the radio control unit 10, the transmitting unit 20, the RF unit 40, and the antenna 50 or a reception apparatus including the radio control unit 10, the receiving unit 30, the RF unit 40, and the antenna 50. In this case, the RF unit 40 functions as a transceiving control unit when data is transmitted and received in the radio communication apparatus 1, functions as a transmission control unit when data is only transmitted in the transmission apparatus, and functions as a reception control unit when data is only received in the reception apparatus.

Next, a transmission operation of the radio communication apparatus 1 will be described. At the time of transmission, the radio control unit 10 outputs net transmission data to be transmitted to the transmitting unit 20.

In the transmitting unit 20, first, the encoding unit 201 performs convolution encoding on the transmission data received from the radio control unit 10. Then, the interleaver 202 performs the interleaving process on the transmission data encoded by the encoding unit 201. For example, the interleaving process is performed by a matrix interleaver in which data is reordered by performing writing in a row direction and performing reading in a column direction in a two-dimensional array of a matrix.

Figure 2:
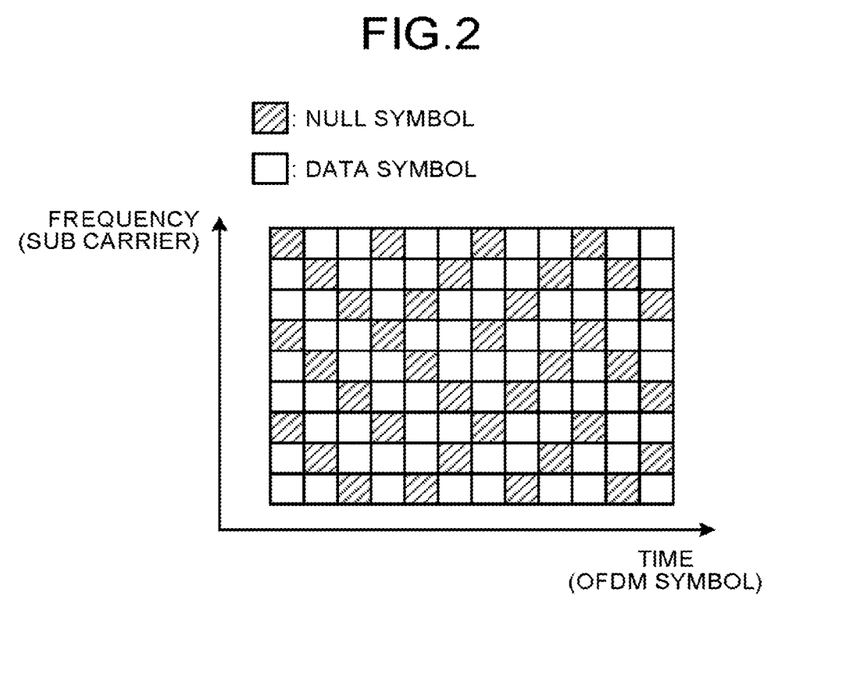
FIG. 2 is a diagram illustrating an arrangement of null symbols and data symbols in a two-dimensional space of an OFDM symbol and a sub carrier.

Next, the null inserting unit 203 inserts null symbols. The null symbols are inserted such that the null symbols are dispersedly arranged between the data symbols in the two-dimensional space of the OFDM symbol and the sub carrier according to a predetermined rule, for example, as illustrated in FIG. 2. FIG. 2 is a diagram illustrating an arrangement of null symbols and data symbols in the two-dimensional space of the OFDM symbol and the sub carrier. It is satisfactory if a null symbol insertion amount is determined according to the environment in which the system to be applied is used, and for example, when a signal of the system has a large amount of interference noise localized in terms of time and frequency, it is appropriate to increase the null symbol amount to be larger than when it has a small amount of interference noise. Further, when there is a large amount of interference noise having a wide frequency band, it is appropriate to reduce the null symbol amount in the frequency direction to be lower than when it has a small amount of interference noise from the perspective of transmission efficiency. Data in which both I data and Q data are 0 is allocated to the null symbol.

Next, the sub carrier mapping unit 204 arranges the transmission data that has undergone the interleaving process performed by the interleaver 202 in the symbols other than the null symbols inserted by the null inserting unit 203.

Figure 3:
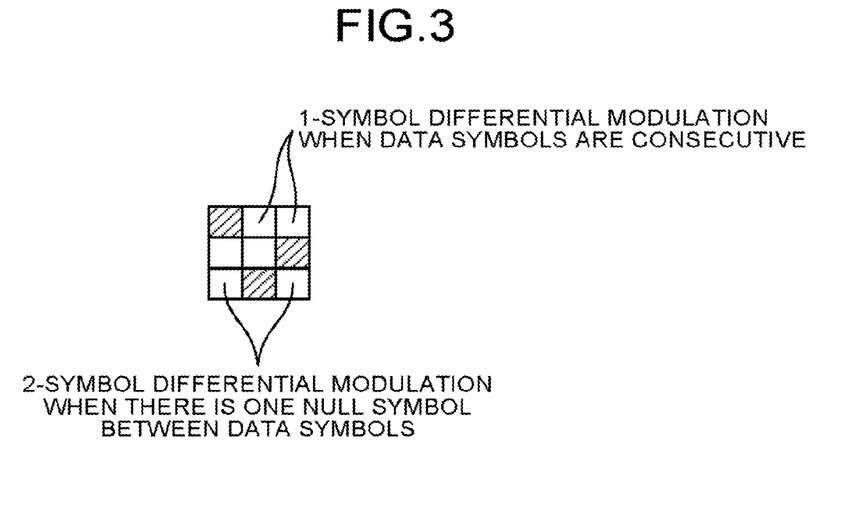
FIG. 3 is a diagram illustrating a differential modulation scheme on the basis of an arrangement of OFDM symbols.

Next, the differential modulating unit 205 performs differential encoding between OFDM symbols on the symbols arranged by the sub carrier mapping unit 204. At this time, as illustrated in FIG. 3, when there is no null symbol between OFDM symbols of the same sub carrier, the differential modulating unit 205 performs differential modulation (1-symbol differential modulation) between the consecutive OFDM symbols, and when there is one null symbol between OFDM symbols of the same sub carrier, the differential modulating unit 205 performs differential modulation (2-symbol differential modulation) between preceding and subsequent OFDM symbols having a null symbol interposed therebetween. FIG. 3 is a diagram illustrating a differential modulation scheme on the basis of an arrangement of OFDM symbols. For example, when the null symbols are consecutively arranged over two OFDM symbols, the differential modulating unit 205 may perform the differential modulation among three symbols. However, in this case, the resistance to the frequency deviation diminishes. Further, the differential modulating unit 205 need not perform the differential modulation between the same sub carriers, and when an OFDM symbol arranged in front is a null symbol, the differential modulation with an OFDM symbol of a neighboring sub carrier may be performed, and it is satisfactory if a method in which a phase shift is small is selected according to the carrier frequency and the movement speed.

Next, the IFFT unit 206 performs an IFFT process for each OFDM symbol that has undergone the differential modulation performed by the differential modulating unit 205, and transforms data in the frequency domain into data in the time domain. Then, the GI adding unit 207 adds the guard interval to the data in the time domain transformed by the IFFT unit 206. Thereafter, the transmission filter 208 performs a transmission filter process on the data including the guard interval added by the GI adding unit 207, and outputs the resulting data to the RF unit 40.

Next, a reception operation of the radio communication apparatus 1 will be described. At the time of reception, the RF unit 40 converts the received signal received by the antenna 50 into a baseband and outputs the baseband to the receiving unit 30.

In the receiving unit 30, first, the reception filter 301 performs a reception filter process on the baseband obtained by converting the received signal by the RF unit 40.

Next, the synchronization control unit 302 synchronizes time and frequency for the received signal that has undergone the reception filter process performed by the reception filter 301. The synchronization control unit 302 performs a synchronization process using a preamble part or the like arranged in the head of a frame serving as the received signal. In the frequency synchronization, the synchronization control unit 302 estimates the frequency deviation caused by a difference in oscillators on the transmission side apparatus and the reception side apparatus and the frequency deviation amount caused by a Doppler frequency associated with movement, and corrects the deviation amount estimated for an input signal. In the time synchronization, the synchronization control unit 302 performs a process of estimating the boundary timing of the OFDM symbol.

Next, the GI removing unit 303 removes the guard interval part from the received signal according to the OFDM symbol timing estimated by the synchronization control unit 302. Then, the FFT unit 304 performs an FFT process on the received signal from which the guard interval part has been removed by the GI removing unit 303, and transforms data in the time domain into data in the frequency domain.

Next, the interference measuring unit 305 measures the interference power from the data allocated to the null symbol in the data transformed into each sub carrier component by the FFT unit 304.

Figure 4:
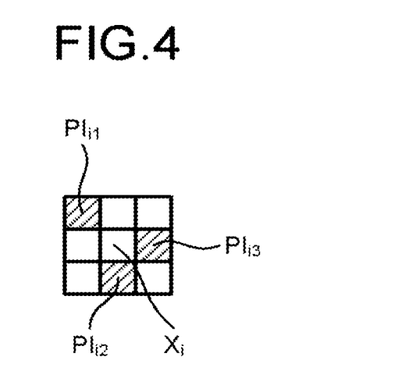
FIG. 4 is a diagram illustrating a method of measuring interference power for a data symbol $x_i$.

Specifically, for the measurement of the interference power, the interference measuring unit 305 measures the interference power from three null symbols in nine OFDM symbols in neighboring sub carriers, for example, as illustrated in FIG. 4. FIG. 4 is a diagram illustrating a method of measuring the interference power for a data symbol $x_i$. If the interference power measured from three null symbols around the data symbol $x_i$ is interference power $PI_{i1}$, $PI_{i2}$, and $PI_{i3}$, the interference measuring unit 305 calculates interference power $PI_i$ for the data symbol $x_i$ with the following Formula (1):

$$PI_i=(PI_{i1}+PI_{i2}+PI_{i3})/3 \qquad (1)$$

Further, when there are two null symbols around the data symbol $x_i$, the interference measuring unit 305 adds the interference power measured from the two null symbols and then divides the resulting interference power by two, and when there are four null symbols around the data symbol $x_i$, the interference measuring unit 305 adds the interference power measured from the four null symbols and then divides the resulting interference power by four. That is, the interference power $PI_i$ can be obtained by adding the interference power measured from respective null symbols and dividing the resulting interference power by the number of null symbols.

Next, when there is no null symbol between the OFDM symbols in the same sub carrier, the delay detecting unit 306 performs delay detection (1-symbol delay detection) between consecutive OFDM symbols, and when there is one null symbol between the OFDM symbols in the same sub carrier, the delay detecting unit 306 performs delay detection (2-symbol delay detection) between preceding and subsequent OFDM symbols having a null symbol interposed therebetween. This correspondence is similar to that when the differential modulating unit 205 performs the differential modulation at the time of transmission.

Here, the delay detecting unit 306 performs weighting according to the interference power that is in accordance with the measurement amount measured by the interference measuring unit 305. If data of a symbols before and after the delay detection is $x_{i-1}$ and $x_i$, and the interference power measured by using null symbols around the data symbol is $PI_{i-1}$ and $PI_i$, data $y_i$ that has undergone the delay detection can be expressed by the following Formula (2). * indicates a conjugate complex, and $\sqrt{(PI_i \cdot PI_{i-1})}$ indicates a square root of $(PI_i \cdot PI_{i-1})$.

$$y_i=(x_i x_{i-1}^*)/(\sqrt{(PI_i \cdot PI_{i-1})}) \qquad (2)$$

Next, the deinterleaver 307 performs, in the opposite order to that at the time of transmission, a deinterleaving process of reordering the data that has undergone the delay detection performed by the delay detecting unit 306. Then, the decoding unit 308 performs an error correction process on the data that has undergone the deinterleaving process performed by the deinterleaver 307 using the Viterbi algorithm. At this time, because the decoding unit 308 can perform the Viterbi decoding process with a likelihood that is correctly weighted according to the interference power, even when the interference is large, the likelihood is not erroneously processed such that it becomes high, and the error correction process is properly performed. The decoding unit 308 outputs the data that has undergone the error correction to the radio control unit 10. For example, the radio control unit 10 performs error detection by a cyclic redundancy check (CRC) or the like and then processes the resulting data as received data.

As described above, according to the present embodiment, in the radio communication apparatus 1, at the time of transmission, the null are dispersedly arranged in the time-frequency domain, and data that has undergone the 1-symbol differential modulation and data that has undergone the 2-symbol differential modulation depending on the presence or absence of the null symbol are mapped to the sub carriers and then transmitted, and at the time of reception, the interference power is measured from the null symbols, 1-symbol delay detection or 2-symbol delay detection is performed depending on the presence or absence of the null symbol, the likelihood is calculated by performing weighting according to the interference power measured from the null symbols, and the error correction process is performed. As a result, it is possible to correctly measure the interference power even for the interference localized in terms of time or frequency, and it is possible to perform the error correction process with the likelihood according to the interference power, and thus it is possible to effectively perform the error correction, and it is possible to obtain the radio communication apparatus having high interference immunity. Further, due to the configuration in which demodulation is performed by the delay detection, it is unnecessary to insert a pilot for transmission path estimation, and thus there is an effect where the transmission efficiency is high, and the configuration is robust regarding transmission path variation in a high speed movement environment or the like.

Second Embodiment

Figure 5:
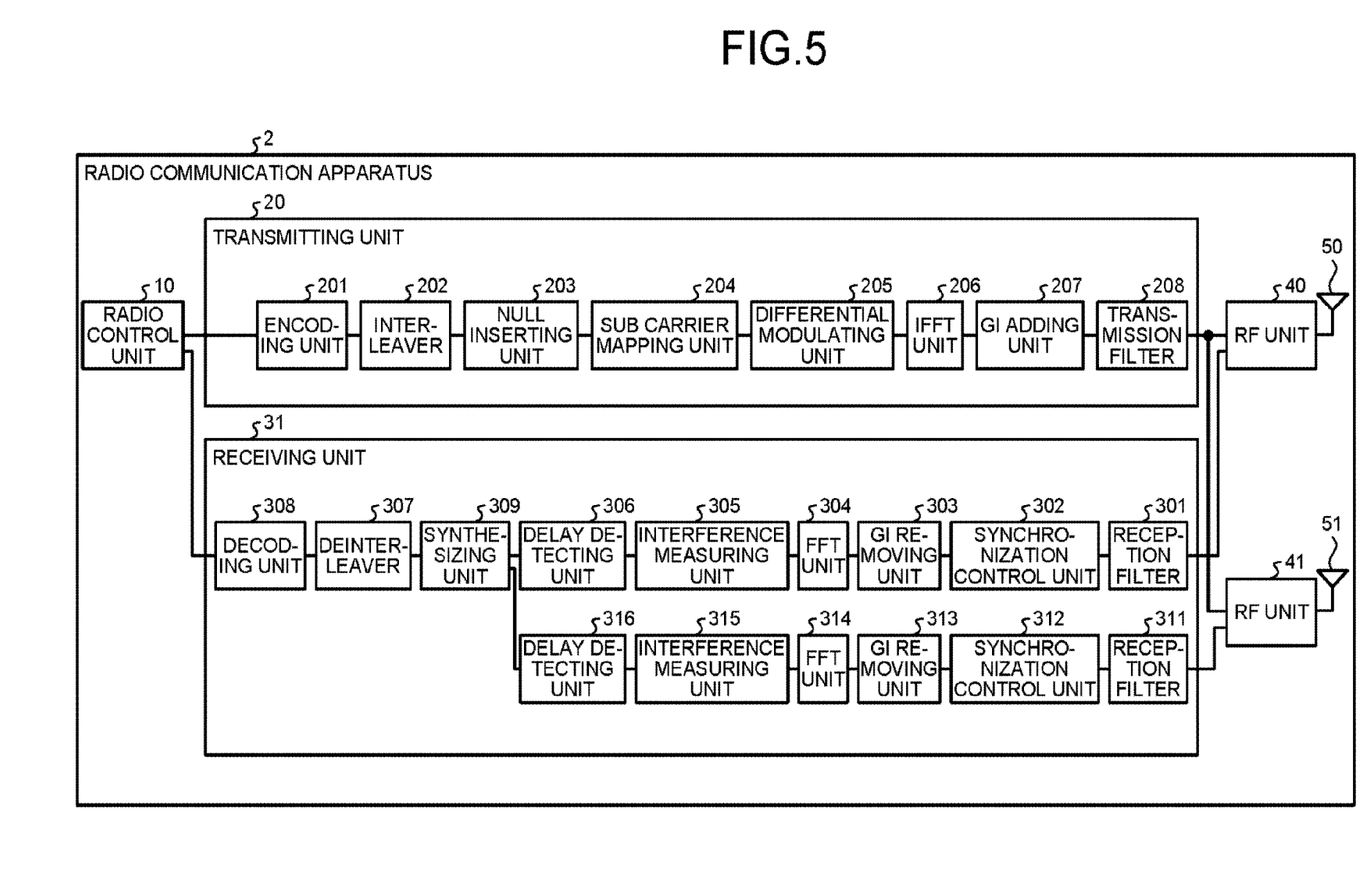
FIG. 5 is a diagram illustrating an exemplary configuration of a radio communication apparatus according to a second embodiment.

In the present embodiment, an explanation will be given of a case where reception is performed by a plurality of antennas. FIG. 5 is a diagram illustrating an exemplary configuration of a radio communication apparatus according to the present embodiment. A radio communication apparatus 2 includes the radio control unit 10; the transmitting unit 20; a receiving unit 31 that functions as a reception apparatus and obtains original transmission data by performing a demodulation process or the like on signal waveform data received from RF units 40 and 41; the RF units 40 and 41; and antennas 50 and 51.

The second embodiment is different from the first embodiment (see FIG. 1) in that the number of antennas that perform transmission and reception is two, and the receiving unit 31 includes reception processing units corresponding to the antennas 50 and 51. The RF unit 41 has a similar configuration to the RF unit 40, and the antenna 51 has a similar configuration to the antenna 50. In the receiving unit 31, components from a reception filter 311 serving as a reception processing unit corresponding to the antenna 51 to a delay detecting unit 316 are similar to the components from the reception filter 301 to the delay detecting unit 306 described above. A synthesizing unit 309 synthesizes outputs of the delay detection units 306 and 316 and outputs the synthesis result to the deinterleaver 307.

In the example illustrated in FIG. 5, a case of two branches (the number of antennas is two) is described, but it is merely an example, and a configuration in which the number of branches is further increased (the number of antennas is three or more) may be provided. In this case, in the radio communication apparatus 2, the components from the reception filter 301 to the delay detecting unit 306 are equipped such that they correspond to the number of branches (the number of antennas), and the synthesizing unit 309 synthesizes data that has undergone the delay detection from as many delay detecting units as there are branches (the number of antennas).

Next, a transmission operation of the radio communication apparatus 2 will be described. An operation of the transmitting unit 20 at the time of transmission is similar to that in the first embodiment, but the transmission filter 208 performs the transmission filter process on the data including the guard interval added thereto and outputs the resulting data to the two RF units 40 and 41. Further, the radio communication apparatus 2 may be configured such that delay diversity is obtained by delaying the output from one RF unit or such that the number of antennas that actually radiate a signal to an antenna at a time is one by controlling an operation of turning the antenna outputs on or off with a switch.

Next, a reception operation of the radio communication apparatus 2 will be described. At the time of reception, the RF unit 40 converts the received signal received by the antenna 50 into a baseband and outputs the baseband to the reception filter 301 of the receiving unit 31. Further, the RF unit 41 converts the received signal received by the antenna 51 into a baseband and outputs the baseband to the reception filter 311 of the receiving unit 31.

Subsequent operations from the reception filter 301 to the delay detecting unit 306 are similar to those in the first embodiment. Further, operations from the reception filter 311 to the delay detecting unit 316 are similar to the operations from the reception filter 301 to the delay detecting unit 306.

If the output of the delay detecting unit 306 weighted according to the measurement result of the interference measuring unit 305 is indicated by $y1_i$, and the output of the delay detecting unit 316 weighted according to the measurement result of an interference measuring unit 315 is indicated by $y2_i$, the synthesizing unit 309 performs synthesis with the following Formula (3):

$$y_i = y1_i + y2_i \tag{3}$$

The synthesizing unit 309 outputs the synthesized data that has undergone the delay detection to the deinterleaver 307. Subsequent operations are similar to those in the first embodiment.

As described above, according to the present embodiment, in the radio communication apparatus 2, the interference power is calculated from data received by each of the two antennas, and weighting of received data is performed according to the calculated interference power, and the two pieces of weighted received data are synthesized. As a result, the resistance to interference or transmission path variation is further increased by the space diversity effect, and thus a radio communication apparatus capable of performing stable communication can be implemented.

Third Embodiment

In the present embodiment, an explanation will be given of a case where frequency hopping is performed. A radio communication apparatus has a similar configuration to that in the second embodiment (see FIG. 5).

Figure 6:
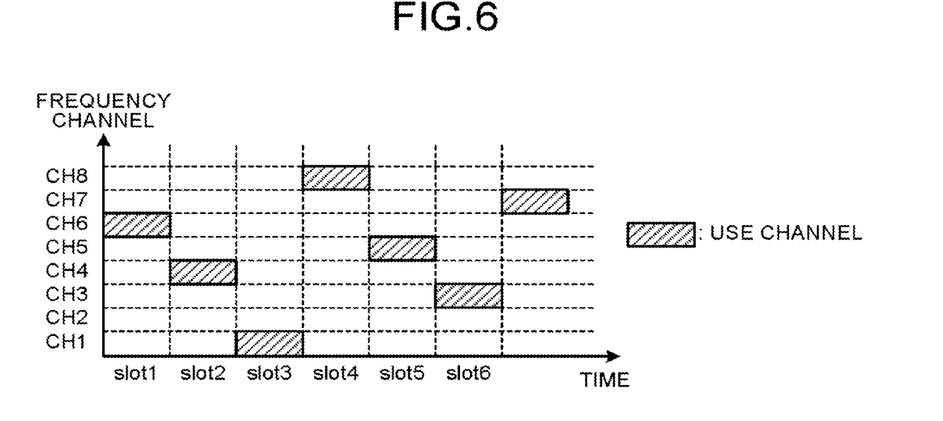
FIG. 6 is a diagram illustrating an example of frequency hopping.

Next, a transmission operation of the radio communication apparatus 2 will be described. Here, the RF units 40 and 41 perform frequency hopping by switching carrier frequencies for transmission and reception with a predetermined period. FIG. 6 is a diagram illustrating an example of frequency hopping. FIG. 6 illustrates a state where a frequency channel to be used is switched in units of slots. The frequency hopping is performed at the same timing at which the synchronization is established between the transmission side apparatus and the reception side apparatus. In this example, transmission and reception of the same data are performed two or more times while performing the frequency hopping. For example, transmission and reception of the same data are performed in a slot 1 and a slot 2 illustrated in FIG. 6. Control of transmitting the same data two or more times in the transmission side apparatus may be performed such that the transmission is performed a predetermined number of times while performing the frequency hopping or such that when the result demodulated by the reception side apparatus has a CRC error, the transmission side is prompted to perform retransmission.

Next, a reception operation of the radio communication apparatus 2 will be described. Operations from the reception filter 301 to the delay detecting unit 306 and operations from the reception filter 311 to the delay detecting unit 316 are similar to those in the second embodiment. The synthesizing unit 309 holds the previously received result, and when the same data transmitted from the transmission side apparatus is received again, the synthesizing unit 309 synthesizes the received data with the previously received result. If the output of the delay detecting unit 306 weighted according to the measurement result of the interference measuring unit 305 in the slot 1 is indicated by $y1_{ki}$, the output thereof in the slot 2 is indicated by $y1_{(k+1)i}$, the output of the delay detecting unit 316 weighted according to the measurement result of the interference measuring unit 315 in the slot 1 is indicated by $y2_{ki}$, and the output thereof in the slot 2 is indicated by $y2_{(k+1)i}$, the synthesizing unit 309 performs the synthesis with the following Formula (4):

$$y_i = y1_{ki} + y2_{ki} + y1_{(k+1)i} + y2_{(k+1)i} \quad (4)$$

When the same data is transmitted and received M times (M is an integer of two or more), the synthesizing unit 309 receives data that is obtained by performing the delay detection on the same data and has been output from each of the delay detecting units 306 and 316 M times, synthesizes M pieces of data that have undergone the delay detection and have been output from the delay detecting units 306 and 316, and outputs the synthesized data. The synthesizing unit 309 outputs the synthesized data that has undergone the delay detection to the deinterleaver 307. Subsequent operations are similar to those in the second embodiment.

An explanation has been given on the basis of the radio communication apparatus 2 of the second embodiment; however, the description can be applied even to the radio communication apparatus 1 of the first embodiment. In this case, in the radio communication apparatus 1, a synthesizing unit that receives data obtained by performing the delay detection on the same data from the delay detecting unit 306 two or more times, synthesizes the received data, and outputs the synthesized data is arranged between the delay detecting unit 306 and the deinterleaver 307.

The example in which the same data is transmitted and received two or more times while performing the frequency hopping has been described; however, transmitting and receiving the same data two or more times may be performed separately from the frequency hopping, or either transmitting and receiving the same data two or more times or the frequency hopping may be performed.

As described above, according to the present embodiment, in the radio communication apparatus 2, the same data is transmitted and received two or more times while performing the frequency hopping, and the synthesizing unit holds previous data and synthesizes the previous data with the currently received result. As a result, as data weighted according to the interference power at the time of reception is synthesized, the time-frequency diversity effect is obtained, the resistance to interference or transmission path variation is further increased, and thus a radio communication apparatus capable of performing stable communication can be implemented.

INDUSTRIAL APPLICABILITY

As described above, the radio communication apparatus, the transmission apparatus, and the reception apparatus according to the present invention are useful for radio communication, and particularly, suitable for a multicarrier scheme.

REFERENCE SIGNS LIST 1, 2 radio communication apparatus, 10 radio control unit, 20 transmitting unit, 30, 31 receiving unit, 40, 41 RF unit, 50, 51 antenna, 201 encoding unit, 202 interleaver, 203 null inserting unit, 204 sub carrier mapping unit, 205 differential modulating unit, 206 IFFT unit, 202 GI adding unit, 208 transmission filter, 301, 311 reception filter, 302, 312 synchronization control unit, 303, 313 GI removing unit, 304, 314 FFT unit, 305, 315 interference measuring unit, 306, 316 delay detecting unit, 307 deinterleaver, 308 decoding unit, 309 synthesizing unit.

The invention claimed is:

1. A radio communication apparatus that performs radio communication according to a multicarrier scheme, the radio communication apparatus comprising:
   a transmitter that includes:
      a null inserter that dispersedly arranges null symbols in a two-dimensional space of time and frequency in radio data, and
      a differential modulator that performs differential modulation on a data symbol part other than the null symbols; and
   a receiver that includes:
      an interference indicator that measures interference power for a data symbol that is a measurement target by using a null symbol adjacent to the data symbol in the two-dimensional space of time and frequency, and
      a delay detector that performs weighting on each data symbol according to the interference power measured for each data symbol and that performs delay detection between data symbols.

2. The radio communication apparatus according to claim 1, wherein
   the differential modulator performs differential modulation by switching an interval between symbols from which a differential is obtained according to number of null symbols between two data symbols on which differential modulation is performed and combining differential modulations in which intervals between differential symbols are different, and
   the delay detector performs delay detection by switching an interval between symbols for delay detection according to number of null symbols between two data symbols on which delay detection is performed and combining delay detections in which intervals between symbols are different.

3. The radio communication apparatus according to claim 1, wherein
   when the radio communication apparatus further comprises transceiving controllers, each of which is connected to the transmitter, the receiver, and a corresponding one of a plurality of antennas and performs control such that data is transmitted and received via the corresponding one of the antennas, a number of the transceiving controllers being equal to a number of the antennas,
   the receiver includes:
      interference indicators, a number of which is equal to the number of the antennas,
      delay detectors, a number of which is equal to the number of the antennas, and a synthesizer that synthesizes data that has undergone delay detection and has been output from the delay detectors, each of the interference indicators measures interference power for data symbols of data received by a different one of the antennas, each of the delay detectors performs weighting on data symbols according to interference power for the data symbols measured by a different one of the interference indicators and performs delay detection between the data symbols, and the synthesizer synthesizes the data that has undergone delay detection and has been output from the delay detecting processing units.

4. The radio communication apparatus according to claim 1, further comprising:

a transceiving controller that is connected to the transmitter and the receiver and that performs control such that same data is transmitted and received M (M is an integer of two or more) times, wherein the receiver further includes a synthesizer that synthesizes a plurality of pieces of data that have undergone delay detection in the receiver, and the synthesizer receives data that is obtained by performing delay detection on same data and has been output from the delay detector M times, synthesizes M pieces of data that have undergone delay detection, and outputs synthesized data.

5. The radio communication apparatus according to claim 3, wherein the transceiving controllers perform control such that same data is transmitted and received M (M is an integer of two or more) times, and the synthesizer receives data that is obtained by performing delay detection on same data and has been output from each of the delay detectors M times, synthesizes M pieces of data that have undergone delay detection and have been output from each of the delay detectors, and outputs synthesized data.

6. The radio communication apparatus according to claim 1, further comprising a transceiving controller that is connected to the transmitter and the receiver and performs control such that data is transmitted and received while performing frequency hopping.

7. The radio communication apparatus according to claim 4, wherein the transceiving controller perform control such that data is transmitted and received while performing frequency hopping.

8. A transmission apparatus that performs radio communication according to a multicarrier scheme, the transmission apparatus comprising:

a transmitter configured to:
dispersedly arrange null symbols in a two-dimensional space of time and frequency in radio data; and
perform differential modulation on a data symbol part other than the null symbols by switching an interval between symbols from which a differential is obtained according to number of null symbols between two data symbols that are disposed in a time direction and on which differential modulation is performed and combining differential modulations in which intervals between differential symbols are different.

9. The transmission apparatus according to claim 8, further comprising transmission controllers, each of which is connected to a corresponding one of a plurality of antennas and performs control such that data is transmitted via the corresponding one of the antennas, a number of the transmission controllers being equal to a number of the antennas.

10. The transmission apparatus according to claim 8, further comprising a transmission controller that performs control such that same data is transmitted M (M is an integer of two or more) times.

11. The transmission apparatus according to claim 9, wherein the transmission controllers perform control such that same data is transmitted M (M is an integer of two or more) times.

12. The transmission apparatus according to claim 8, further comprising a transmission controller that performs control such that data is transmitted while performing frequency hopping.

13. The transmission apparatus according to claim 10, wherein the transmission controllers perform control such that data is transmitted while performing frequency hopping.

14. A reception apparatus that performs radio communication according to a multicarrier scheme, wherein when a transmission side apparatus dispersedly arranges null symbols in a two-dimensional space of time and frequency in radio data and performs differential modulation on a data symbol part other than the null symbols, the reception apparatus further comprises a receiver that includes:
an interference indicator that measures interference power for a data symbol that is a measurement target by using a null symbol adjacent to the data symbol in the two-dimensional space of time and frequency; and
a delay detector that performs weighting on each data symbol according to the interference power measured for each data symbol and that performs delay detection between data symbols.

15. The reception apparatus according to claim 14, wherein the delay detector performs delay detection by switching an interval between symbols for delay detection according to number of null symbols between two data symbols on which delay detection is performed and combining delay detections in which intervals between symbols are different.

16. The reception apparatus according to claim 14, further comprising:

reception controllers, each of which is connected to a corresponding one of a plurality of antennas and performs control such that data is received via the corresponding one of the antennas, a number of the reception controllers being equal to a number of the antennas, wherein the receiver includes:
interference indicators, a number of which is equal to the number of the antennas;
delay detectors, a number of which is equal to the number of the antennas; and
a synthesizer that synthesizes data that has undergone delay detection and has been output from the delay detectors, each of the interference indicators measures interference power for data symbols of data received by a different one of the antennas, each of the delay detectors performs weighting on data symbols according to interference power for the data symbols measured by a different one of the interference indicators and performs delay detection between the data symbols, and the synthesizer synthesizes the data that has undergone delay detection and has been output from the delay detectors.

17. The reception apparatus according to claim 14, wherein when the transmission side apparatus transmits same data M (M is an integer of two or more) times, the reception apparatus further comprises a reception controller that performs control such that same data is received M (M is an integer of two or more) times, the receiver further includes a synthesizer that synthesizes a plurality of pieces of data that have undergone delay detection, and the synthesizer receives data that is obtained by performing delay detection on same data and has been output from the delay detector M times, synthesizes M pieces of data that have undergone delay detection, and outputs synthesized data.

18. The reception apparatus according to claim 16, wherein when the transmission side apparatus transmits same data M (M is an integer of two or more) times, the reception controllers perform control such that same data is received M (M is an integer of two or more) times, and the synthesizer receives data that is obtained by performing delay detection on same data and has been output from each of the delay detectors M times, synthesizes M pieces of data that have undergone delay detection and have been output from each of the delay detectors, and outputs synthesized data.

19. The reception apparatus according to claim 14, wherein, when the transmission side apparatus transmits data while performing frequency hopping, the reception apparatus further comprises a reception controller that performs control such that data is received while performing frequency hopping.

20. The reception apparatus according to claim 17, wherein, when the transmission side apparatus performs transmits data while performing frequency hopping, the reception controllers perform control such that data is received while performing frequency hopping.

\* \* \* \* \*